United States Patent [19]
Readshaw et al.

[11] Patent Number: 4,887,494
[45] Date of Patent: Dec. 19, 1989

[54] SAW BENCHING ROLLS

[75] Inventors: Lenard T. Readshaw, Port Alberni; Cornelis N. VanVelzen; John L. Paquette, both of Qualicum Beach; Kenneth O. McKeown, Port Alberni, all of Canada

[73] Assignee: Innovations Ltd., Port Alberni, Canada

[21] Appl. No.: 97,852

[22] Filed: Sep. 17, 1987

[51] Int. Cl.⁴ .............................................. B23D 63/18
[52] U.S. Cl. ............................................. 76/27; 72/247
[58] Field of Search .................... 76/27, 25 R; 72/247

[56] References Cited

U.S. PATENT DOCUMENTS

| | | | |
|---|---|---|---|
| 510,210 | 12/1893 | Toomer | 76/27 |
| 1,038,127 | 9/1912 | Hedstrom | 76/27 |
| 1,053,746 | 2/1913 | Roach | 76/27 |
| 1,096,756 | 5/1914 | Roach | 76/27 |
| 1,462,836 | 7/1923 | Thomas | 76/27 |

FOREIGN PATENT DOCUMENTS 939488 4/1948 France ................................. 76/27

OTHER PUBLICATIONS

"Armstrong Stretcher Rolls for Circular Saws," Armstrong Manufacturing Company brochure, Portland, Ore.
"Replacement Stretcher Rolls," Williams & White Machine Shop Ltd, brochure, Burnaby, B.C., Canada.
"REKMATIC: An Automatic Bandsaw Maintenance Machine," Wood Machining News, vol. 3, No. 5, 1986, and attached literature.

Primary Examiner—Roscoe V. Parker
Attorney, Agent, or Firm—Bull Housser & Tupper

[57] ABSTRACT

A set of two saw benching rolls. Each roll has a surface divided into two sections. One section is in the form of a convex surface and the other is in the form of a concave surface. The rolls are mounted in an opposed relationship and are operable to apply pressure to a saw placed there between. By moving the two rolls axially and relative to one another in the various positions, the saw may be "leveled up" or "leveled down" to remove discontinuities. The benching rolls may also be used in the conventional manner to tension or to shear the saw.

12 Claims, 3 Drawing Sheets

SAW BENCHING ROLLS

INTRODUCTION

This invention relates to a set of two saw benching rolls and, more particularly, to a pair of saw benching rolls, each having a surface defined by a convex and concave portion and being axially movable relative to each other.

BACKGROUND OF THE INVENTION

The large increase in home building in recent years, the long recognized attractiveness of wood as a decorative and attractive building material and the decrease in lumber availability due to declining supply of logs and their subsequent high cost has resulted in an increased emphasis on quality production of lumber resources and the reduction of fibre waste. This is particularly so in the lumber mills where logs are cut into lumber used for various purposes.

The saws used to cut lumber, be they circular or band type, must be leveled and tensioned, i.e., "benched", so as to reduce the cut in the log caused by the saw to a minimum value. This cut is known as the "kerf" and it is most desirable to have a kerf as narrow as possible to reduce wastage. It is estimated, for example, that a saw improperly benched by only 0.001 inch can cause $12,000.00 annually in lost revenue because of the loss of wood. In addition, it is desirable to produce a quality cut. Such quality cuts can result in lumber having an appearance close to that of planed lumber which increases the price that can be obtained.

Present saw leveling operations are unsatisfactory. The basic technique is to simply use a hammer to pound the discontinuities in the saw flat. While this technique does result in relatively flat saws, hammer blows create concomitant stress associated with impact concentrations. Poor or foul hammer blows can also create permanent marks on the saw, which will result in reduced saw performance and increased saw maintenance. Furthermore, training of a "saw filer" to level a saw by hammering is a lengthy and expensive process.

Another technique utilizes saw leveling rolls. In this method, a first roll with a concave surface is located on one side of the saw and a second roll with a convex surface is located on the opposite side of the saw. This method, however, removes only discontinuities in one direction and cannot be used for tensioning or shearing.

In addition to proper leveling of the saw, it is frequently necessary to "tension" the saw. Saw tensioning creates a pair of "tire lines" on the saw which are required for proper running of the saw on the wheels of the bandmill when under sawing operation. These tire lines are created by moving a saw through tensioning rolls which have opposed convex surfaces. The surfaces are applied to the saw and act to minutely thin and thereby lengthen the saw in front of and behind the tire lines. One tire line is located immediately back of the saw teeth and is known as the "front" tire line. The other tire line is the "back" tire line and it is located on the opposite or back edge of the saw away from the cutting teeth. The front tire line is minutely thicker than the back tire line. This is so because the heat and stress created on the teeth when cutting lumber will lengthen the front tire line of the saw which will then approach the length of the back tire line and which, in turn, will allow the saw to run true on the wheels of the bandmill when the saw is in operation.

SUMMARY OF THE INVENTION

According to one aspect of the invention, there is disclosed a pair of saw benching rolls, each of said rolls having a surface operable to contact the saw and to bench said saw between said surfaces, each surface including a concave and a convex portion and being operable to be moved relative to said other surface.

According to a further aspect of the invention, there is disclosed a method of benching a saw comprising the steps of mounting said saw between the surfaces of a pair of benching rolls, each of said surfaces including a convex and a concave portion, locating an imperfection on said saw, determining whether said imperfection is an inside or outside high spot, moving one of said convex surfaces on one benching roll to a position opposed from the concave surface on the other benching roll, applying a predetermined pressure between said surfaces on said saw and moving said saw for a predetermined distance between said surfaces.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
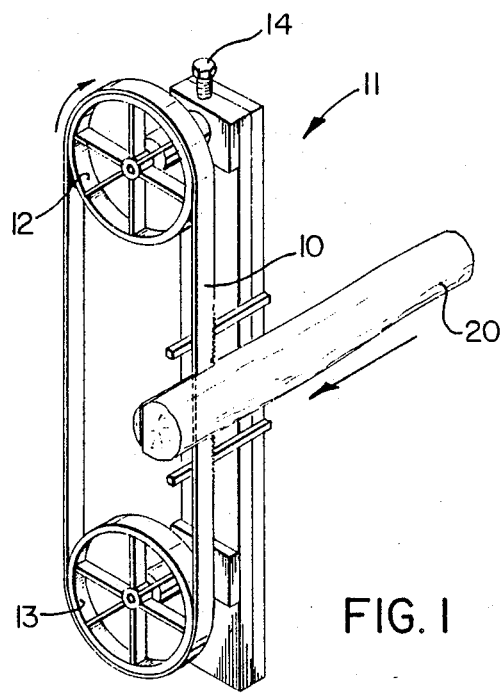
FIG. 1 is an isometric diagrammatic view of a saw in operating position on a bandmill used for cutting lumber or logs.

With reference to the drawings, a saw 10 is shown in its operating environment on a bandmill generally shown at 11 in FIG. 1. The saw 10 is endless and is mounted on two wheels 12, 13 which are adjustable by strain adjuster 14 to provide the correct strain on the saw 10 and to allow the saw 10 to run true on the wheels 12, 13. The log 20 or lumber to be cut enters the bandmill 11 in a plane normal to the plane of the figure as illustrated by the arrow.

Figure 2:
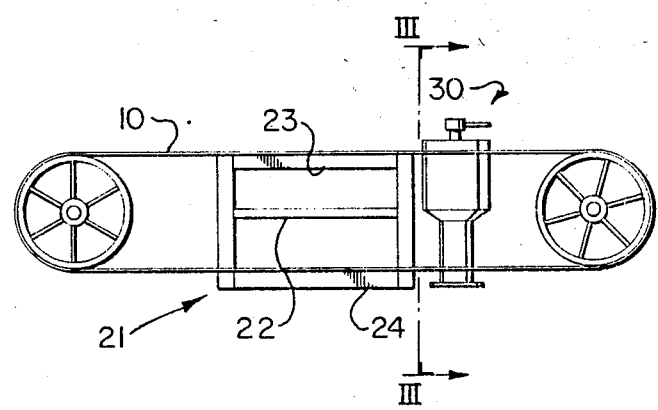
FIG. 2 is a diagrammatic isometric side view of a saw bench illustrating the saw in position to perform the leveling and tensioning operations.

Reference is now made to FIG. 2 wherein the saw 10 has been removed from the bandmill 11 and has been positioned on a saw bench generally shown at 21 for benching. The saw bench 21 comprises a frame 22 which supports leveling slabs 23, 24 used for levelling the saw 10 by use of a hammer. A stretcher roll assembly 30 is located adjacent frame 22 and is used to tension the saw 10 as will be described in greater detail.

Figure 3A:
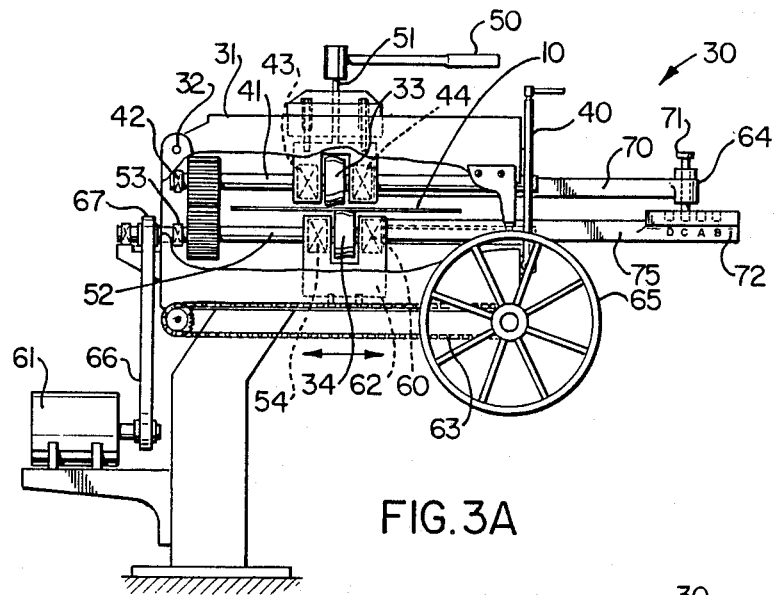
FIG. 3A is a partial cutaway, side view taken along III—III of FIG. 2 and illustrating the benching rolls within the stretcher roll assembly with a saw therebetween according to the invention, the stretcher roll assembly being illustrated in a closed position.
Figure 3B:
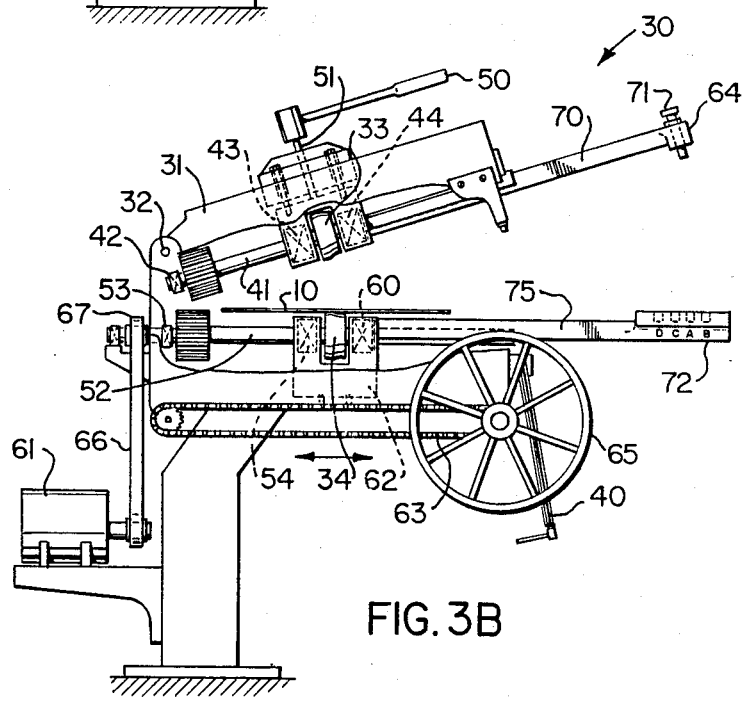
FIG. 3B is a view similar to FIG. 3A but illustrating the stretcher roll assembly in an open position.

The stretcher roll assembly 30 is shown in further detail in FIGS. 3A and 3B. The top arm 31 is pivoted about a pin 32 allowing the placement of the saw 10 between the rolls 33, 34. The top arm 31 is secured in place by pressure yoke 40. The upper shaft 41 is mounted in bearing 42 and split bearings 43, 44 mounted in top arm 31. Split bearings 43, 44 are located on each side of benching roll 33. Benching roll 33 is keyed to the upper shaft 41 and rotates with upper shaft 41. A pressure screw lever 50 is connected to pressure screw 51, which is mounted on top of top arm 31. The rotation of pressure screw lever 50 moves benching roll 33 downwardly relative to the saw 10 which is illustrated in a sectional configuration.

The lower shaft 52 is mounted in the lower section of the stretcher roll assembly 30. Lower shaft 52 is mounted between bearing 53 and split bearings 54, 60 located on each side of benching roll 34.

The lower shaft 52 is driven by a motor 61 via a chain 66 and a sprocket 67. The benching roll 34 is keyed to the lower shaft 52 so as to rotate with the driven lower shaft 52. A block 62 is connected to a chain 63. Chain 63 is movable under the influence of a hand wheel 65 connected to the chain 63 by a sprocket gear (not shown). The chain 63 is adapted to move the upper and lower benching rolls 33, 34 together and simultaneously through the connection between pin 71 and female bracket 72, in either of the directions illustrated by the arrow, when the stretcher roll assembly is in the closed position as illustrated in FIG. 3A.

A pin box 64 is connected to the upper sleeve arm 70 which extends to benching roll 33. The pin 71 within the pin box 64 is received by a female bracket 72 in one of four positions as shown, which positions will be described in greater detail hereafter. The pin is spring loaded in the down or engaged position. Benching roll 34 is moved relative to benching roll 33 by disengaging pin 71 and moving benching roll 34 via chain 63 and handwheel 65.

Figures 4A, 4B:
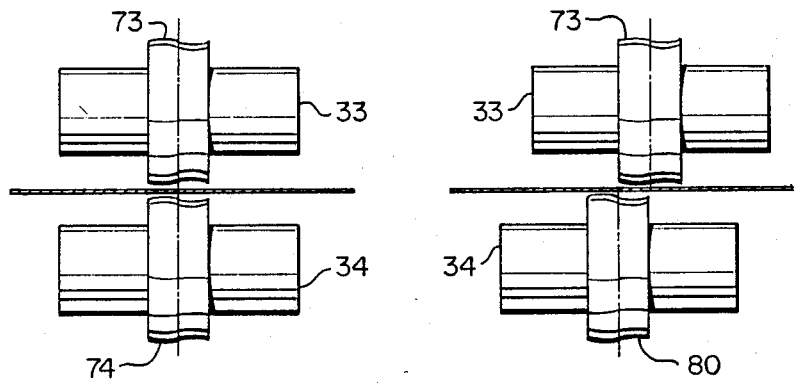
FIGS. 4A. 4B, 4C and 4D are enlarged views illustrating the benching rolls in each of their respective operating positions.

Reference is now made to FIGS. 4A through 4D which illustrate the four configurations the bench rolls 33, 34 of FIG. 3A may take. With reference initially to FIG. 4A, the bench rolls 33, 34 are in the tensioning position. That is, the convex portion 73 of the surface of the bench roll 33 is located opposite the convex portion 74 of the bench roll 34 with the saw 10 located between the bench rolls 33, 34.

With reference to FIG. 4B, the upper bench roll 33 has its convex surface 73 opposed to concave surface 80 of the lower bench roll 34 with the saw 10 there between. Such a configuration is used to level the saw 10 downwardly and is referred to as the level down position.

Figures 4C, 4D:
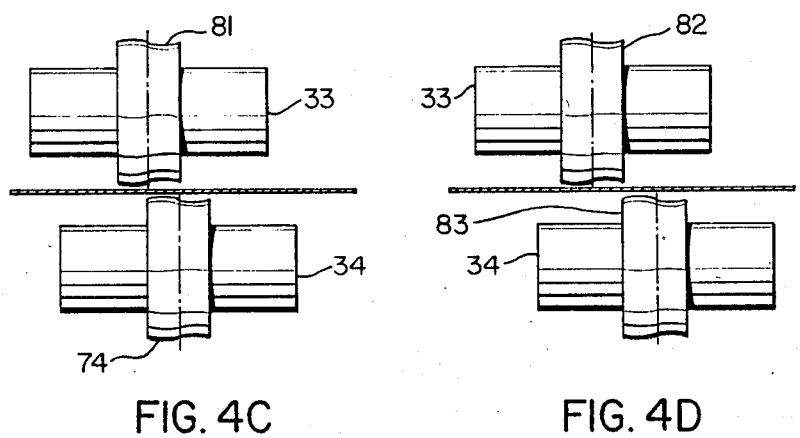

With reference now to FIG. 4C, the concave surface 81 of the upper bench roll 33 is opposed to the convex surface 74 of the lower bench roll 34. In this configuration, the saw 10 is leveled up and is referred to as the level up position.

With reference to FIG. 4D, the edge 82 of upper bench roll 33 and the edge 83 of the lower bench roll 34 are brought into close alignment. This configuration is used to shear the saw 10 and is referred to as the shearing position.

OPERATION

In operation, the saw 10 is removed from the bandmill 11 (FIG. 1) and is mounted on the saw bench 21 (FIG. 2) by clamping the saw 10 in the stretcher roll assembly 30 of FIG. 3B. After the saw 10 is mounted in the stretcher roll assembly 30, top arm 31 is closed to the horizontal position indicated and is secured by pressure yoke 40, FIG. 3A.

It will be assumed that the operator or saw filer has used a straight edge on the saw 10 and has found a low spot in the saw 10 that requires the saw to be leveled upwardly. The upper bench roll 33 will be moved on shaft 41 together with the lower bench roll 34 until the low spot in the saw 10 is directly under the convex surface 73 upper bench roll 33. To accomplish this, pin 71 will be pulled up and out of engagement with female bracket 72, the lower roll 34 and the female bracket 72 which are physically attracted by lower sleeve arm 75 will be moved rightwardly by use of handwheel 65 until the pin 71 is directly over receptacle C in the female bracket 72 wherein the pin 71 is released and then enters the receptacle C as shown in FIG. 3A. In this position, the configuration for the bench rolls shown in FIGS. 3A and 4C is obtained.

The saw filer will thereafter apply the desired pressure between the bench rolls 33, 34 on the saw 10 by using the pressure screw lever 50 and pressure screw 51. The saw 10 will be leveled upwardlY as it is passed back and forth between the rolls 33, 34 under the influence of the driven roll 34 until the discontinuity has been removed. In a similar manner level down configuration is achieved. The bench rolls 33, 34 will be moved in an analogous manner and the operating configuration will assume that shown in FIG. 4B. In this orientation, the pin 71 will be received by receptacle B in the female bracket 72.

In the tensioning process, the pin 71 will be received by receptable A in female bracket 72. In this position, the upper and lower bench rolls 33, 34 will assume the configuration illustrated in FIG. 4A. When the bench rolls 33, 34 assume this configuration, the tensioning process can be carried out as is usual.

In the shearing process, the pin 71 will be received by receptacle D in the female bracket 72. In this position, the upper and lower bench rolls 33, 34 will take the configuration illustrated in FIG. 4D. When the bench rolls 33, 34 assume this configuration, the shearing process can be carried out.

While a specific embodiment of the invention has been described, such description should be taken as illustrative only. Many further modifications may be made by those skilled in the art and the invention should be limited only in accordance with the scope of the appended claims.

What is claimed is:

1. A set of saw benching rolls, each of said rolls having a surface operable to contact a saw and to bench said saw between said surfaces, each of said surfaces including a concave and convex portion, each of said portions being operable to apply pressure on said saw relative to said other portion.

2. A set of saw benching rolls as in claim 1 wherein said saw benching rolls number two.

3. A set of saw benching rolls as in claim 2 wherein one of said rolls is axially movable relative to the other of said rolls.

4. A set of saw benching rolls as in claim 3 wherein said convex portion of one of said surfaces is operable to be located opposite said concave portion of the other of said surfaces.

5. A set of saw benching rolls as in claim 3 wherein said concave portion of one of said surfaces is operable to be located opposed said convex surface of the other of said surfaces.

6. A set of saw benching rolls as in claim 3 wherein each of said benching rolls further comprise an edge portion extending substantially normal to the axial direction of said rolls, said edge portion of one of said rolls being operable to be located in alignment with said edge portion of the other of said rolls.

7. A set of saw benching rolls as in claim 3 wherein said convex portion of one of said rolls is operable to be located opposed said convex portion of the other of said rolls.

8. A method of benching a saw comprising the steps of mounting said saw between the surfaces of two benching rolls, each of said surfaces including a convex and concave portion, locating an imperfection on said saw, determining whether said imperfection is an inside or outside high spot, moving one of said convex portions on one of said rolls to a position opposed to one of said concave portions on the other of said rolls, applying a predetermined pressure between said portions on said saw and moving said saw for a predetermined distance through said portions.

9. A method of benching a saw as in claim 8 wherein said rolls are moved relative to each other in an axial direction.

10. A method of benching a saw as in claim 9 wherein said saw is moved by rotating both of said rolls.

11. A set of saw benching rolls as described in claim 3, further comprising fixing means for temporarily fixing one of the said rolls in a first position wherein the convex portion of one of said surfaces is located opposite the convex portion of the other of said surfaces, a second position wherein the concave portion of said one of said surfacers is located opposite the convex portion of said other of said surfaces and a third position wherein the convex portion of said one of said surfaces is located opposite the concave portion of said other of said surfaces.

12. A set of saw benching rolls as described in claim 11 wherein each of said benching rolls further comprise an edge portion extending substantially normal to the axial direction of said rolls and wherein said fixing means temporarily fixes said one of said rolls in a fourth position wherein said edge portion of one of said rolls is located opposite said edge portion of the other of said rolls.

* * * * *